No. 684,242. Patented Oct. 8, 1901.
J. H. HILL & J. RIVETT.
EVAPORATING PAN.
(Application filed Apr. 25, 1901.)

(No Model.) 2 Sheets—Sheet 1.

Witnesses:
D. W. Gardner
John Kirn

Inventors:
James H. Hill
John Rivett
By their Attorney
Geo. W. Miatt

No. 684,242. Patented Oct. 8, 1901.
J. H. HILL & J. RIVETT.
EVAPORATING PAN.
(Application filed Apr. 25, 1901.)
(No Model.) 2 Sheets—Sheet 2.
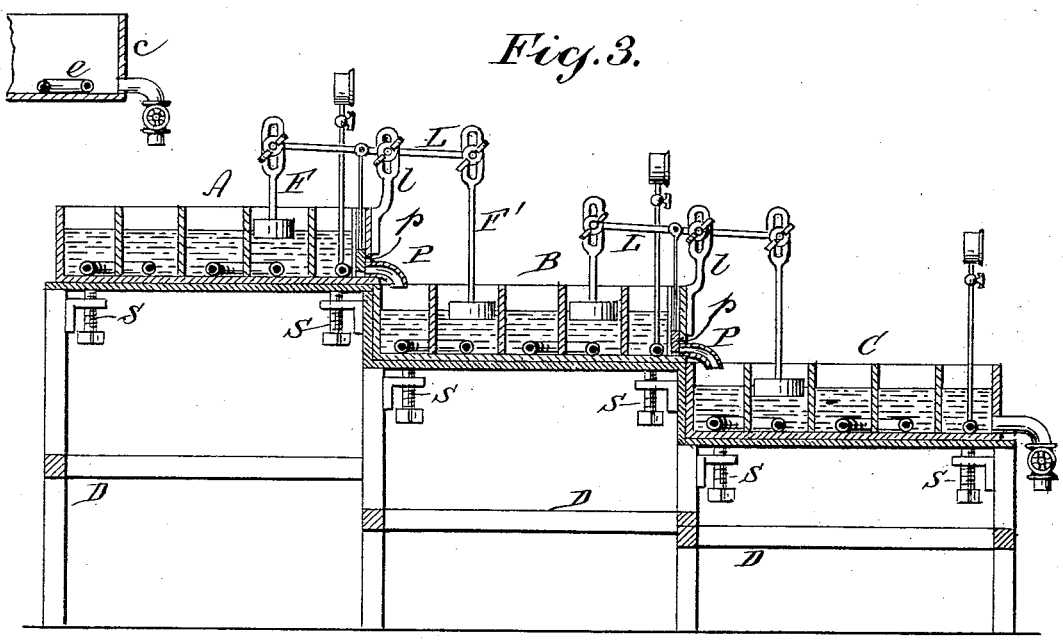
Fig. 3.
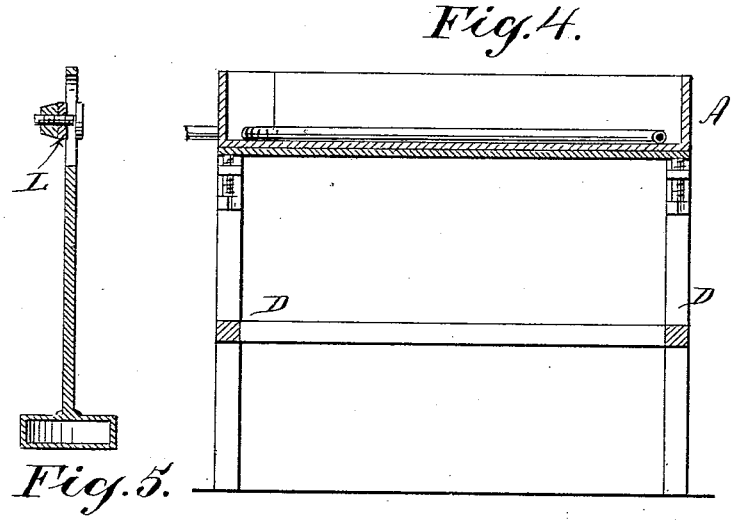
Fig. 4.
Fig. 5.
Witnesses:
D. W. Gardner
John Kirn
Inventors:
James H. Hill
John Rivett
By their Attorney
Leo. Wm. Miatt

UNITED STATES PATENT OFFICE.

JAMES H. HILL AND JOHN RIVETT, OF HORSESHOE, NEW YORK.

EVAPORATING-PAN.

SPECIFICATION forming part of Letters Patent No. 684,242, dated October 8, 1901.

Application filed April 25, 1901. Serial No. 57,402. (No model.)

*To all whom it may concern:*

Be it known that we, JAMES H. HILL and JOHN RIVETT, citizens of the United States, residing at Horseshoe, St. Lawrence county, and State of New York, have invented certain new and useful Improvements in Evaporating-Pans, of which the following is a specification sufficient to enable others skilled in the art to which the invention appertains to make and use the same.

Our invention relates more particularly to evaporating-pans for heating maple-sap, the main object being to maintain prescribed levels in several successive pans by means which are automatic, at the same time rendering the apparatus comparatively simple and cheap as well as effective.

The invention consists in the special construction and arrangement of parts herein described and claimed specifically.

Figure 2:
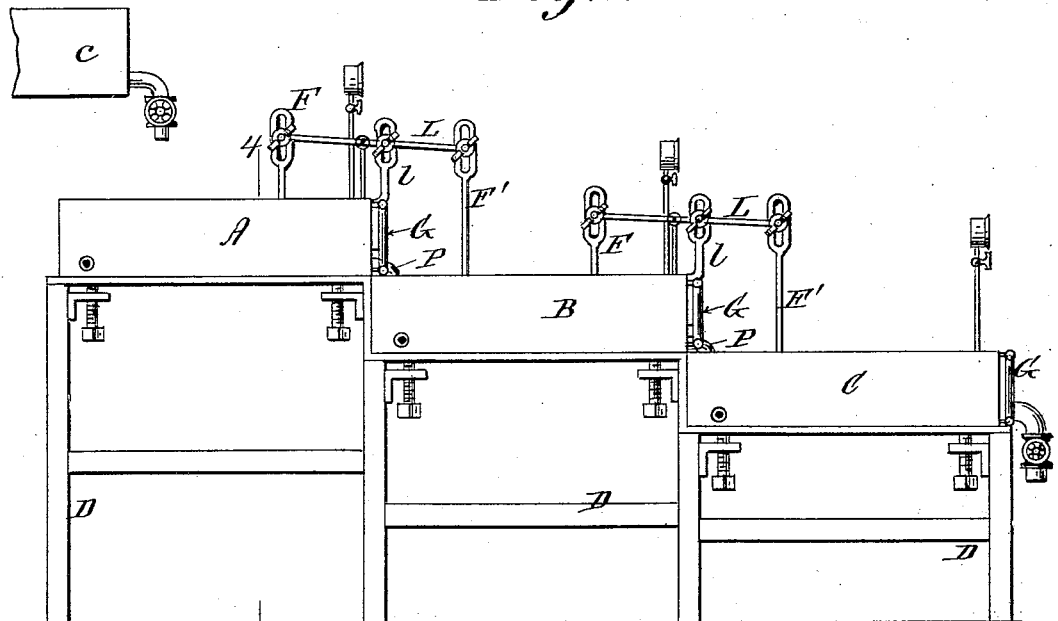
Figure 1:
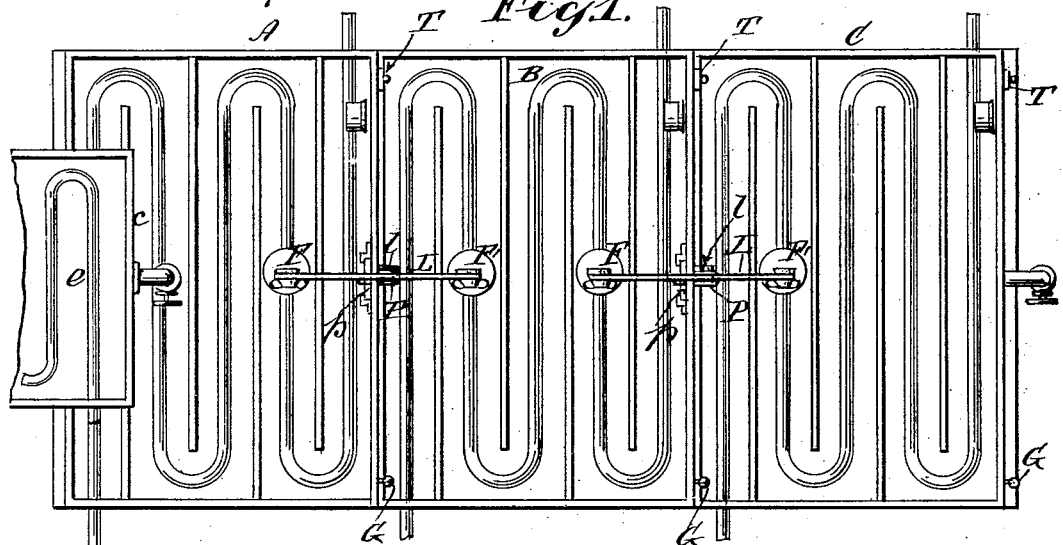

In the accompanying drawings, Figure 1 is a plan of our improved apparatus; Fig. 2, a side elevation thereof; Fig. 3, a vertical longitudinal section upon plane of line 3 3, Fig. 1; Fig. 4, a transverse section upon plane of line 4 4, Fig. 2. Fig. 5 is a sectional elevation, upon an enlarged scale, showing clearly the mechanism for automatically regulating the level of the sap within adjoining pans.

A B C represent three evaporating-pans supported upon any suitable frame D, the pans being arranged successively on different planes. The sap is fed into the first pan A from an elevated tank c, in which it is subjected to a preliminary heating by a coil of steam-pipe e. Each evaporating-pan is also provided with a coil of steam-pipe in the usual way and with gages G and thermometers T for the purpose of indicating the level of the sap and the temperature thereof. The sap is conducted from one pan to another through a pipe or conduit P, controlled by a gate-valve $p$. This valve is operated by a lever L, pivotally supported upon a bracket $l$ or other stationary part of the apparatus. The lever carries two floats F F', the rods of which are adjustable upon the lever L. The fulcrum of the lever L may also be made adjustable, as shown, thus providing for a universal adjustment by which the parts may be regulated with accuracy with relation to the work to be done.

It is obvious that in operation the lower end of the float F' in pan B will tend to raise the gate-valve $p$ and from it an increased flow of sap, whereas as the float F' is raised by the inflow of the sap it will tend to close the gate-valve. In like manner as the level of the sap raises in the pan A it will tend to raise the gate-valve $p$, and vice versa, the action of the floats tending constantly to maintain a uniform level in all the pans.

The horizontal and vertical adjustment of the evaporating-pans A B C is effected by means of the set-screws S S, or by any equivalent mechanical expedient. The partitions I in the pans insure a circuitous course for the sap and a uniform heating thereof.

What we claim as our invention, and desire to secure by Letters Patent, is—

1. In evaporating apparatus, the combination of two or more evaporating-pans, one upon a higher plane than the other, a conduit for feeding the sap from the higher pan to the lower pan, a valve controlling said conduit, a rod connected with said valve and with a controlling-lever, said controlling-lever, a float in the upper pan connected with said controlling-lever, and a float in the lower pan connected with said controlling-lever, whereby the flow of sap through the said conduit is controlled automatically, substantially as set forth.

2. In evaporating apparatus, the combination of two or more evaporating-pans upon different planes, a conduit for feeding the sap from a higher to a lower pan, a valve controlling the flow of sap through said conduit, means for connecting said valve with a controlling-lever, a float in the upper pan connected with said controlling-lever, a float in the lower pan connected with said controlling-lever, and means for adjusting the fulcrum of said controlling-lever for the purpose and substantially in the manner set forth.

3. In evaporating apparatus the combination of two or more evaporating-pans upon different planes, a conduit for feeding the sap from a higher to a lower pan, a valve controlling said conduit, means for connecting said valve adjustably with a controlling-lever, a float in the upper pan connected with said controlling-lever, and a float in the lower pan connected with said controlling-lever, for the purpose and substantially in the manner described.

4. In evaporating apparatus, the combination of two or more evaporating-pans upon different planes, a conduit for feeding the sap from a higher to a lower pan, a valve controlling the flow of sap through said conduit, means for connecting said valve with a controlling-lever, a float in an upper pan connected with said controlling-lever, a float in a lower pan connected with said controlling-lever and means for adjusting either one or both of said floats with relation to the controlling-lever, for the purpose and substantially as herein set forth.

JAMES H. HILL.
JOHN RIVETT

Witnesses:
D. W. GARDNER,
JOHN KIRN.